United States Patent [19]

Carson

[11] 4,121,567

[45] Oct. 24, 1978

[54] SOLAR ENERGY COLLECTING POND AND COVERING THEREFOR

[75] Inventor: Don B. Carson, Mt. Prospect, Ill.

[73] Assignee: UOP Inc., Des Plaines, Ill.

[21] Appl. No.: 784,217

[22] Filed: Apr. 4, 1977

Related U.S. Application Data

[63] Continuation-in-part of Ser. No. 744,062, Nov. 22, 1976, abandoned, and a continuation-in-part of Ser. No. 744,063, Nov. 22, 1976, Pat. No. 4,072,579, and a continuation-in-part of Ser. No. 744,064, Nov. 22, 1976, Pat. No. 4,046,640, and a continuation-in-part of Ser. No. 744,065, Nov. 22, 1976, Pat. No. 4,046,639.

[51] Int. Cl.² ............................................. F24J 3/02
[52] U.S. Cl. ................................. 126/271; 237/1 A
[58] Field of Search ............... 126/270, 271; 237/1 A; 202/234; 203/11, 15, DIG. 1; 4/172.12, 172.13; 165/49, 53

[56] References Cited

U.S. PATENT DOCUMENTS

| 3,620,206 | 11/1971 | Harris, Jr. et al. | 126/271 |
| 3,994,278 | 11/1976 | Pittinger | 126/271 |
| 4,015,582 | 4/1977 | Liu et al. | 126/271 |
| 4,022,187 | 5/1977 | Roberts | 126/271 |

*Primary Examiner*—Kenneth W. Sprague
*Assistant Examiner*—James C. Yeung
*Attorney, Agent, or Firm*—James R. Hoatson, Jr.; Robert W. Erickson; William H. Page, II

[57] ABSTRACT

A buoyant, solar radiation-transparent covering for a water-containing, solar energy collecting pond. The pond is intended for utilization in the generation of power and/or the recovery of potable water from salinous, or otherwise brackish water. An enclosed, unitary chamber, containing a fibrous, solar radiation-transparent substance constitutes the pond covering.

7 Claims, 2 Drawing Figures

SOLAR ENERGY COLLECTING POND AND COVERING THEREFOR

RELATED APPLICATIONS

The present application is a Continuation-In-Part of my copending applications Ser. Nos. 744,062, abandoned, 744,063, U.S. Pat. No. 4,072,579, 744,064, U.S. Pat. No. 4,046,640 and 744,065, U.S. Pat. No. 4,046,639, all of which were filed on Nov. 22, 1976. All the teachings of said copending applications are incorporated herein by way of specific reference thereto.

APPLICABILITY OF INVENTION

The invention herein described is directed toward a solar energy collecting pond, and the covering therefor, intended to be employed in processes for generating power and/or recovering potable water from salinous or otherwise non-potable water. Although applicable for use in a variety of processes which function with many types of brackish and/or salinous water, the solar pond of the present invention is principally intended for those which are directed toward the processing of sea water. My copending applications, above-identified, are directed to four such processes, all of which include the use of a shallow solar pond for collecting and absorbing solar energy. The solar energy collecting pond and radiation-transparent covering herein described are well suited for use therein.

According to many knowledgeable scientific experts, the world is currently entering into a period of time which might well be referred to as the "energy shortage" age. Whether considering (1) the availability of natural gas, (2) the sufficiency of oil reserves, or (3) untapped sources of coal, the consensus appears to indicate that a severe energy crisis is, or will soon be an established fact. In a similar vein, many areas of the world, especially those which are arid, face a critical shortage of potable water, both for human consumption and irrigation. Although sparsely located throughout the world, such areas abound particularly in the Southwestern United States, the Middle Eastern countries and in the Northern desert regions of Africa. Coincidentally, many of these countries, or localized areas thereof, either border upon, or are readily accessible to sea and/or ocean waters. The process encompassed by my inventive concept, although not limited to these areas, is primarily applicable thereto. Exemplary of such an area is Saudi Arabia, the Western coast of which borders upon the Red Sea.

In order to alleviate both of the foregoing situations, consideration is currently being given to the use of naturally-occurring ocean thermal gradients and the harnessing of the virtually limitless supply of solar energy. In many instances, these two natural sources of energy are being employed in combination. My invention involves a solar pond intended to be utilized in collecting radiant solar energy through the absorption thereof into a shallow body of relatively cold water, whereby the temperature thereof is increased significantly.

OBJECTS AND EMBODIMENTS

A principal object of the present invention is to provide a solar radiation-transparent covering for a solar energy collecting pond. A corollary objective involves the design and construction of a solar pond possessing a high absorptivity/emissivity ratio.

More specifically, one of my objectives is directed toward more efficient utilization of the absorbed solar energy to achieve higher temperatures of the water contained in the solar pond, and to do so in a more economical fashion by providing a buoyant covering which floats upon the surface of the water therein.

These, as well as other objects, are made possible through the use of a buoyant solar pond covering which comprises, in cooperative relationship: (a) an enclosed unitary chamber having (i) an upper horizontal surface transparent to solar radiation and, (ii) a parallel lower horizontal surface; and, (b) a fibrous, solar radiation-transparent substance disposed between said upper and lower horizontal surfaces, and substantially filling the entire enclosed chamber.

In another embodiment, my inventive concept encompasses a solar energy collecting pond which comprises, in cooperative relationship: (a) a water-containing reservoir having at least one water-inlet conduit and at least one water-outlet conduit; (b) a layer of insulating material contiguous with the interior surfaces of the bottom and vertical walls of said reservoir; (c) a water-impermeable substance contiguous with substantially the entire inner surface of said insulating material; and, (d) a buoyant solar radiation-transparent covering having (i) parallel upper and lower horizontal surfaces forming an enclosed chamber and, (ii) a fibrous, solar radiation-transparent substance disposed between said horizontal surfaces and substantially filling said enclosed chamber.

These, as well as other objects and embodiments will become evident, to those possessing the requisite skill in the appropriate art, from the following detailed description of the present invention. In one such other embodiment, the buoyant covering is slidably adjacent the entire inner periphery of the reservoir.

PRIOR ART

It would appear that the greater proportion of available prior art consists of articles published in the various trade and scientific journals. An example of these will be discussed hereinbelow. With respect to issued patents, these appear to be principally directed toward various devices capable of utilizing radiant solar energy for (1) heating homes and other structures, and, (2) the desalination of non-potable water. For example, respecting the latter: U.S. Pat. Nos. 3,803,591 (Cl. 202-234), issued Aug. 20, 1957; 3,813,063 (Cl. 202-234), issued Nov. 12, 1957; and, 2,848,389 (Cl. 202-234), issued Aug. 19, 1958 are directed to the use of solar stills for the recovery of potable water. In U.S. Pat. No. 2,803,591, the still employs a complicated series of mirrors to concentrate the rays of the sun; in U.S. Pat. No. 2,813,063, the still itself is fabricated from a semi-rigid, but flexible material such as polyethylene which is transparent with respect to solar radiation.

Of further interest is an article entitled "Desalination of Sea Water Using Solar Radiation Under Retarded Evaporation Conditions", *Industrial Engineering Chemistry, Process Design Development,* Volume 14, No. 4, 1975, pp. 351–358. Described is a desalination process which primarily uses the temperature difference between surface sea water and deep sea water. A shallow pond, swamp area, or a large heating flat is proposed for use as a radiant energy sink. Water, from the surface, is pumped into the pond where it is heated by solar radiation. An insoluble monolayer, or a thin, transparent plastic sheet on the water surface is used to suppress evaporative heat loss from the water layer. The heated water is fed into a heat exchanger which functions as a vacuum chamber. The warm sea water partly flash evaporates while it runs down a packed section. The vapor condenses in an adjoining section over cooling coils being supplied with cold deep sea water, which cooling water is returned to the sea.

Thus, candor compels recognition and acknowledgment that water-containing ponds for collecting solar energy are employed in prior art processes; furthermore, such solar ponds are inclusive of a transparent sheet disposed upon the surface of the water contained therein. However, the appropriate prior art does not seem to be cognizant of the buoyant, fibrous material-containing pond covering herein described.

SUMMARY OF INVENTION

In further describing the solar energy collecting pond encompassed by the present inventive concept, it will be understood that (1) it does not depend upon the existence and availability of an ocean thermal gradient for its efficacy, or, (2) upon the intended end result of its use — e.g. for power generation, potable water recovery, or both. The precise overall dimensions of the solar pond are primarily dependent upon the available insolation; this is generally expressed as the quantity of B.T.U.'s, from the sun, falling upon a square foot of heat sink surface per day, or the incidence of solar energy. Solar radiation heat sinks may take the form of flat plate collectors, or, in the interests of capital investment enhancement, a shallow solar pond. The latter constitutes a more economical device for capturing a portion of the insolation falling upon it from the sun. Water is pumped into the solar pond to a depth which varies seasonally, much the same as the insolation from the sun varies seasonally. A depth in the range of about 1 to about 10 inches is acceptable, although a solar pond depth from 2 to about 8 inches appears to be the most practical.

The shape of the solar pond, formed as a depression in the surrounding soil or sand, is not especially critical; it may, therefore, be circular, oval, square, oblong, etc. The length and width, or diameter of the solar pond are determined by the terrain and climate which are peculiar to the locale of the unit. The temperature to which the water in the solar pond is heated, prior to being charged to the process, in turn is dictated by the relative quantities of potable water and/or generated power which the selected installation is designed to deliver. For example, a solar pond receiving insolation in the amount of about 3,000 BTU/sq.ft./day, and functioning at an efficiency of say 60.0%, could heat a 3-inch level of water from about 85° F. up to about 200° F. during a period of approximately 10 daylight hours. Solar pond efficiency is determined by comparing its absorptivity with the total insolation available. Efficiency can be maximized, through the use of the present invention, by minimizing the heat losses attributed to (i) losses via conduction into the earth, (ii) losses to the surrounding atmosphere by way of convection and conduction and, (iii) atmospheric losses which arise as a result of re-radiation.

Of importance, with respect to the efficiency of the solar pond, is the insulation of the sides and bottom thereof. Several techniques to accomplish this will become evident to those possessing the requisite skill in the appropriate art. For instance, the solar pond can be formed as a depression in the surrounding terrain and have a layer of insulating material contiguous with the interior surfaces of the bottom and vertical walls. The insulation layer can be selected from a wide variety of commercially available material such as styrofoam, vermiculite, fiberglass, matted or fused alumina fibers, etc. This insulation layer is lined, preferably on both inner and outer surfaces, with a water-impermeable substance such as a thin, black sheet of polymeric material including polyethylene, polyvinyl chloride, polyvinyl carbonate, etc. The insulating material can be foamed on and thus become integral with the polymeric sheet. As a practical matter, the water-impermeable substance need be black only on the interior surfaces.

In order to achieve reasonably good solar pond efficiency, evaporative heat loss therefrom must be inhibited through the use of a covering which is transparent to solar radiation, while being impervious to the passage of water vapor or air. As previously set forth, this is recognized by the prior art. Additionally, a suitable covering, in accordance with the present inventive concept, will provide an insulating effect between the water being heated and the atmosphere such that conductive and convective heat loss is minimized. The solar radiation-transparent covering, in accordance with the present invention, is an enclosed unitary chamber having separated parallel horizontal surfaces, and has the general appearance of a box-like structure. A fibrous, solar radiation-transparent substance is disposed intermediate the horizontal surface and substantially fills the entire enclosed chamber.

The upper horizontal surface is always transparent to solar radiation, whereas the lower horizontal surface, which directly contacts the surface of the pond water may either be transparent, or constitute a black body. These parallel surfaces, as well as those forming the vertical periphery of the chamber, may be fabricated from comparatively thin sheets (four to about eight mils) of a polymeric material such as polyethylene, polyvinyl chloride, polyvinyl carbonate, etc. When the lower horizontal surface is intended to be black-bodied, the aforementioned material may be colored black or dark green, etc. The outer, vertical periphery of the box-like covering is slidably adjacent the entire interior surface of the pond to permit free vertical movement as the water level increases or decreases.

The fibrous substance, disposed intermediate the horizontal sheets, will have a thickness generally in the range of about 0.5 to about 4.0 inches, and will substantially completely fill the entire closed chamber. Suitable fibrous substances may be generally characterized as glass-like, and include fiberglass, glass wool, alumina fibers, silica fibers, alumina-silica fibers, other thread-like material, etc.

BRIEF DESCRIPTION OF DRAWING

In additionally describing the solar energy collecting pond of the present invention, reference will be made to the accompanying drawing which illustrates several embodiments thereof. It is understood that the FIGURES are presented solely for illustration, and are not to be considered as drawn to precise scale; therefore, they are not construed as unduly limiting the scope and spirit of the appended claims.

DETAILED DESCRIPTION OF DRAWING

Figure 1:
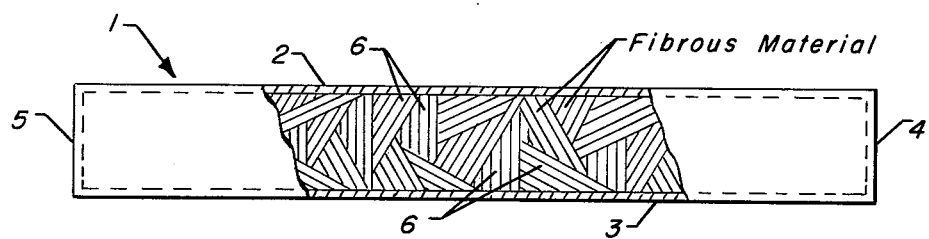
FIG. 1 constitutes a partially-sectioned elevation of the solar pond box-like covering 1 substantially filled with a fibrous material 6.

Specifically referring now to the accompanying drawing, solar pond covering 1 is presented in a partially-sectioned elevation view in FIG. 1. The covering is formed by separated and parallel upper horizontal surface 2 and lower horizontal surface 3. These are formed into a box-like structure by way of vertical sides 4 and 5. Upper horizontal surface 2 is formed from a suitable solar radiation-transparent substance such as polyethylene. Lower horizontal surface 3 is fabricated from a black-bodied material such as black polyvinyl chloride. Since the vertical outer periphery of the covering 1 is intended to be slidably adjacent the interior surface of the pond, it will generally comprise a heavier gauge of stronger material such as polyvinyl carbonate. The unitary, box-like chamber is substantially completely filled with a fibrous substance such as alumina fibers.

Figure 2:
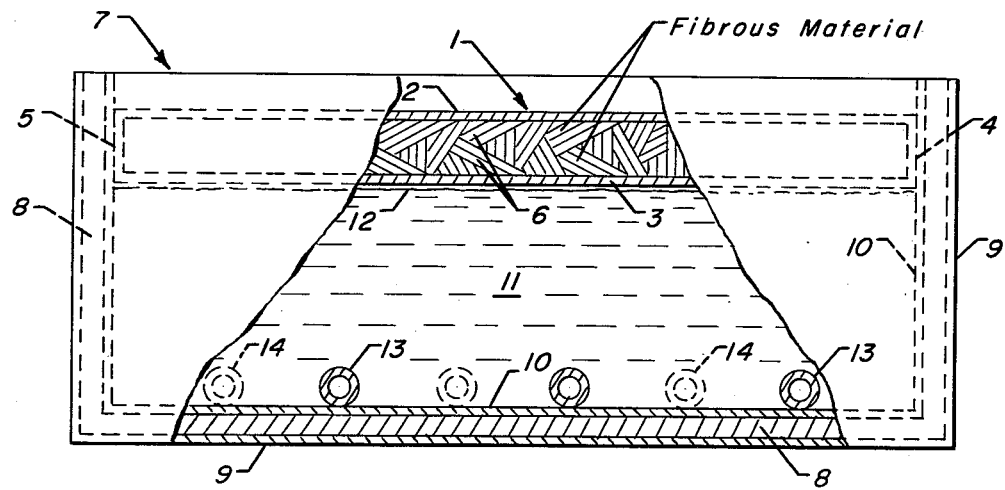
FIG. 2 is a partially-sectioned elevation of a solar energy collecting pond 7 incorporating the covering 1 of FIG. 1.

A solar energy collecting pond 7, having pond covering 1 as an integral element is presented in FIG. 2. Solar pond 7 is formed as a depression in the soil or sand (not illustrated herein), and is lined with a layer of insulating material 8 along its bottom and vertical surfaces. The interior surfaces of insulation layer 8 are lined with a water-impermeable substance 10 (black polyvinyl chloride) and the outer surfaces with a like substance 9, which may also be black-bodied. The lower horizontal surface 3 of covering 1 floats upon the surface 12 of pond water 11, and is free to move vertically as the depth of the latter increases, or decreases. Solar pond 7 is adapted with a plurality of water-inlet conduits 14 (shown herein in phantom) and water-outlet conduits 13. The number of conduits will depend upon the size of the solar pond, and one each will suffice in some situations. Governing the number is the need to withdraw the heated water 11 as quickly as possible following the daylight period during which the temperature has been increased.

The foregoing is believed to present a concise description of the solar energy pond of the present invention and a clear understanding thereof, particularly when viewed in conjunction with the accompanying drawing.

I claim as my invention:

1. A solar energy collecting pond which comprises, in cooperative relationship:
  (a) an insulated water-containing reservoir having at least one water-inlet conduit and at least one water-outlet conduit;
  (b) a buoyant solar radiation-transparent covering having vertically spaced upper and lower horizontal surfaces and vertical side walls forming an enclosed chamber floating on the surface of the water in said reservoir and substantially coextensive in area with the water surface in the reservoir, the upper surface of said chamber being formed of a continuous sheet of radiation-transparent material; and
  (c) a fibrous, solar radiation-transparent substance disposed between said horizontal surfaces and substantially filling said enclosed chamber.

2. The solar pond of claim 1 further characterized in that said lower horizontal surface of said chamber is transparent to solar radiation.

3. The solar pond of claim 1 further characterized in that said lower horizontal surface of said chamber is a black-body.

4. The solar pond of claim 1 further characterized in that said fibrous substance has a thickness in the range of about 0.5 to about 4.0 inches.

5. The solar pond of claim 1 further characterized in that said fibrous substance is glass-like.

6. The solar pond of claim 1 further characterized in that said fibrous substance is silica fibers.

7. The solar pond of claim 1 further characterized in that said fibrous substance is alumina fibers.

* * * * *